(12) United States Patent
Kurosawa et al.

(10) Patent No.: US 6,606,299 B1
(45) Date of Patent: Aug. 12, 2003

(54) SYSTEM FOR MODIFYING PATH IN TRANSMISSION NETWORK SYSTEM

(75) Inventors: Katsuhiko Kurosawa, Tokyo (JP); Nobuhiro Kusumoto, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/397,737

(22) Filed: Sep. 16, 1999

(30) Foreign Application Priority Data

Sep. 16, 1998 (JP) ............................................ 10-261878

(51) Int. Cl.⁷ .................................................. H04J 1/16
(52) U.S. Cl. ........................................ 370/225; 370/248
(58) Field of Search ................................ 370/217, 218, 370/225–228, 222, 244, 248, 252, 461, 462, 133; 714/4, 43, 49, 52, 719, 704, 3

(56) References Cited

U.S. PATENT DOCUMENTS 5,640,415 A * 6/1997 Pandula ...................... 375/133
5,644,567 A * 7/1997 Ikeda ......................... 370/225
5,761,212 A * 6/1998 Foland et al. ............... 714/719
5,974,027 A * 10/1999 Chapman .................... 370/228

FOREIGN PATENT DOCUMENTS

| JP | 5-227818 | 9/1993 |
| JP | 6-326722 | 11/1994 |
| JP | 9-135243 | 5/1997 |
| JP | 10-224389 | 8/1998 |

OTHER PUBLICATIONS

N. Kawaswe et al., (Review of the Non–short Break Frame Switching Method in an SDH Network), Institute of Electronics, Information and Communication Engineers Journal B–1, 1995, vol. J78–B–1 No. 12, pp. 764–772.

* cited by examiner

Primary Examiner—Dang Ton
Assistant Examiner—Melanie Jagannathan
(74) Attorney, Agent, or Firm—Scully, Scott, Murphy & Presser (57) ABSTRACT

There is disclosed a system for modifying a path taken in a transmission network system comprising first and second nodes. The first node routes a signal transmit to a first line to a second line. The second node checks the quality of the first and second lines. After checking that the second line is of good quality, the second node selects the second line. The first node stops entry of signals into the first line. Thus, modification of the path is completed.

13 Claims, 11 Drawing Sheets

SYSTEM FOR MODIFYING PATH IN TRANSMISSION NETWORK SYSTEM

BACKGROUND OF THE INVENTION

1. Field of the Invention

The present invention relates to a ring network formed by nodes and, more particularly, to a path modification system used in such a ring network to modify the used path without interrupting the main signal by checking the quality of the transmission line.

2. Description of the Prior Art

One conventional path modification system is now described. It is assumed that a first line has been already set up from a first node to a second node. The first node is so set up that a second line extends from outside the ring to a third node. The same SDH (synchronous digital hierarchy) signal is sent to the second line as done to the first line. The third node is so set up that the SDH signal received from the first node is sent to a fourth node. The fourth node receives the SDH signals from the first and second lines, respectively, at the second and third nodes, respectively. The fourth node is set up in the manner described below to switch the direction of reception of signals to be sent to the outside of the ring.

The line going from the second node to the outside of the ring is disconnected at the fourth node. The fourth node is so set up that a signal received at the third node is sent to the outside of the ring. To remove the setting on the side of the first line used prior to the modification, the line setting at the second node to go from the first node to the fourth node is deleted. The modification of the path from the first line to the second line is completed by the procedure described thus far.

The operation of the conventional method of modifying the path as described above is described below. The second node is receiving the signal that is sent from the first node to the first line. This state is referred to as state 1. To change the path, the first node transmits the same signal to the second line as done to the first line. This state is referred to as state 2. The second node disconnects the line receiving from the first line (state 3) and connects the line receiving from the second line (state 4). Subsequently, the first node stops input of signals to the first line. Thus, modification of the path is completed.

It is not assured that the line set up to make a transition from state 1 to state 2 is transmitting the signal to be transmitted to the first line. That is, the line set up to make a transition from state 1 to state 2 is merely a novel line added. Since the second node cannot receive two different signals simultaneously, it is necessary to disconnect the first line connected to the second node in order to make a transition from state 2 to state 4. The second node connects the second line. Because the second node does not have a function of checking the quality of the signals received from the first and second lines, respectively, and their identity, the signal from the second line is received on the assumptions that the novel second line added to the first node is transmitting the same signal as done by the first line and that the second line has good quality. However, the conventional path modification system has the following problems.

First, both paths are once broken at the fourth node and so the path cannot be modified during operation. Secondly, it is impossible to check at the fourth node that the signals passing through the first and second lines are the same and, consequently, there is a possibility that a signal different from the signal sent prior to the modification of the path is transmitted. Thirdly, the quality of the second line that will be used is not checked at the fourth node and so a connection may be made to a line that is poorer in quality than the first line used heretofore. In consequence, the line may be broken.

SUMMARY OF THE INVENTION

It is an object of the present invention to provide a path modification system which having various functions, e.g., BRDG registration setting, BRDG deletion, ROLL setting, and quality checking, and which is capable of changing a used path in a transmission network system from a line in which quality deterioration occurs during operation of the system to a line of high quality, and which is capable of preventing occurrence of misconnection that would normally be caused by selecting a different signal.

The above-described object is achieved by a path modification system in accordance with the present invention, the system being used to modify the used path in a transmission network system formed by nodes. This path modification system comprises a quality checking means for checking the quality of a transmission line and a bit error checking means for checking bit errors of a received signal. The path is modified so that the main signal is not interrupted.

Other objects and features of the invention will appear in the course of the description thereof, which follows.

DESCRIPTION OF THE PREFERRED EMBODIMENTS

Figure 1A:
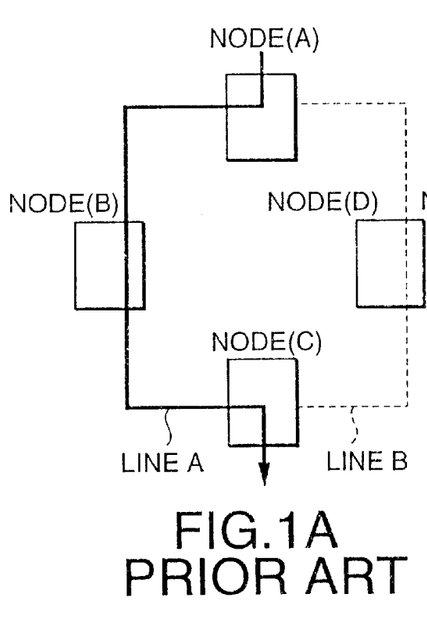
FIGS. 1A through 1D are circuit diagrams of the prior art path modification system, illustrating its operation.
Figure 1B:
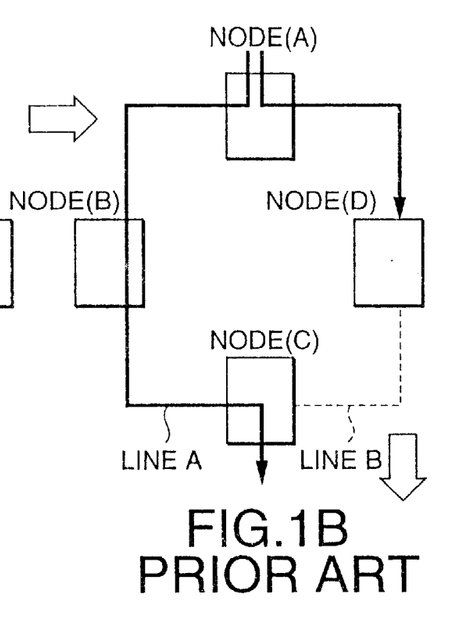
Figure 1C:
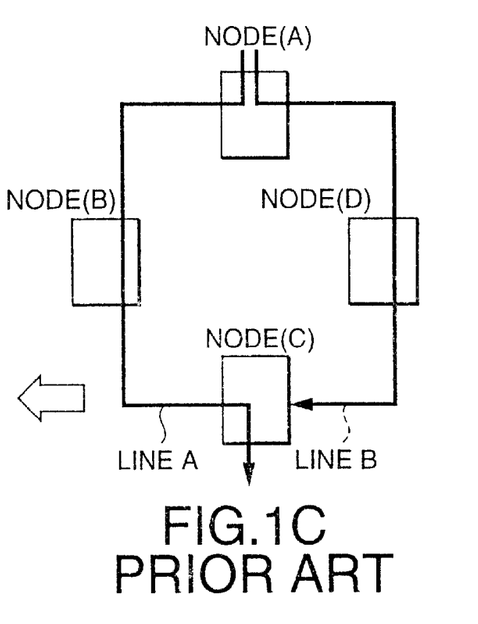

One conventional path modification system is next described by referring to FIGS. 1A through 1D and 2A through 2C. When a line A has been already set up from a node A to a node B, a line B is set up for the node A. The line B set up from outside the ring to a node D. The same SDH signal as sent to the line A is sent to the line B (FIG. 1A). The node D is so set up that the SDH signal received from the node A is sent to the node C (FIG. 1C). SDH signals from lines A and B are received at the nodes B and D, respectively. To switch the direction of reception of a signal to be sent to the outside of the ring, the node C is set up as follows.

Figure 1D:
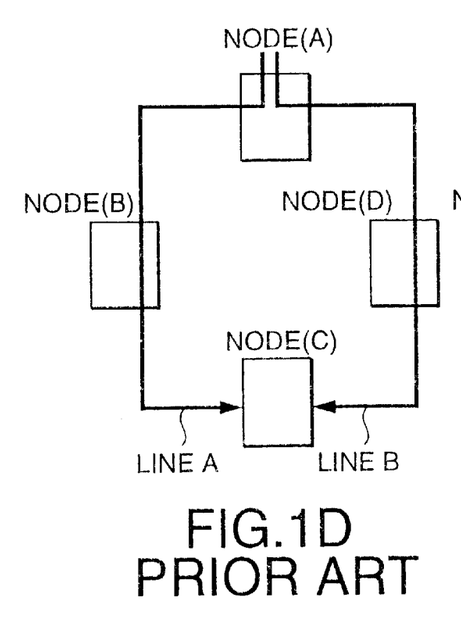
Figure 2A:
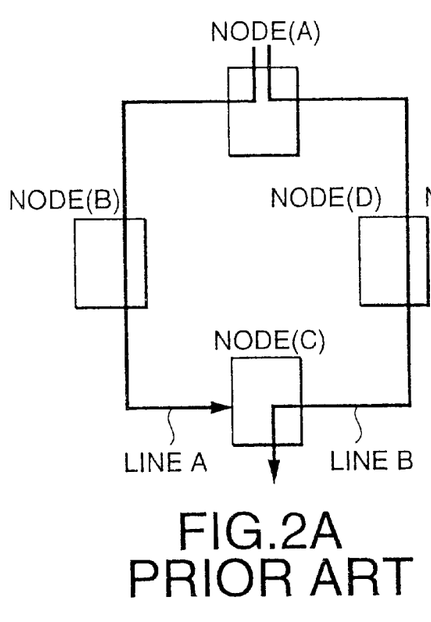
FIGS. 2A through 2C are circuit diagrams illustrating the operation of the system shown in FIGS. 1A through 1D after state 4.
Figure 2B:
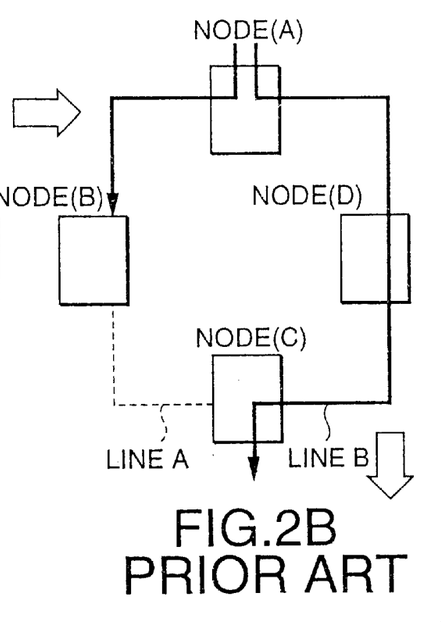
Figure 2C:
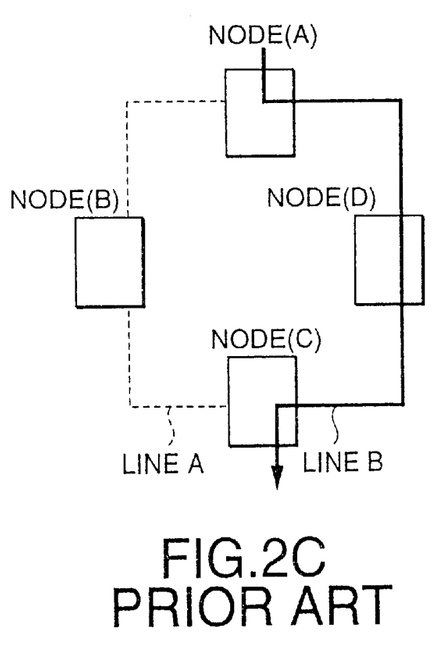

The fourth node C is so set up that the line going from the second node B to the outside of the ring is disconnected (FIG. 1D). The fourth node C is set up so that the signal received from the third node D is sent to the outside of the ring (FIG. 2A). To eliminate the setting on the side of the first line A used prior to the modification, the line setting at the second node B to send signals from the first node A to the fourth node C is eliminated (FIG. 2B). The setting at the first node A to transmit signals from outside the ring to the second node B is eliminated (FIG. 2C). The modification of the path from the line A to the line B is completed by the procedure described thus far.

Figure 3A:
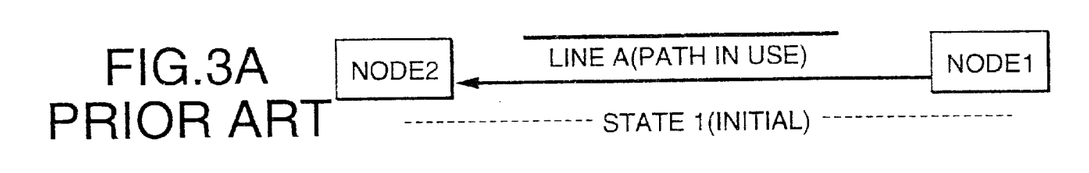
FIGS. 3A through 3E are diagrams illustrating various states of the prior art path modification system shown in FIGS. 1A through 1D.
Figure 3B:
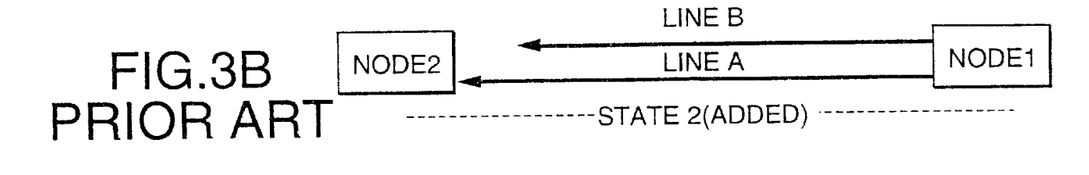
Figure 3C:
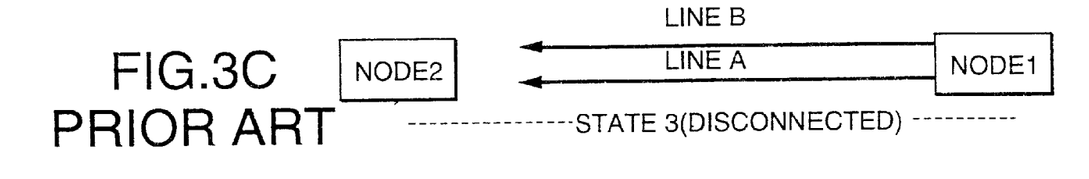
Figure 3D:
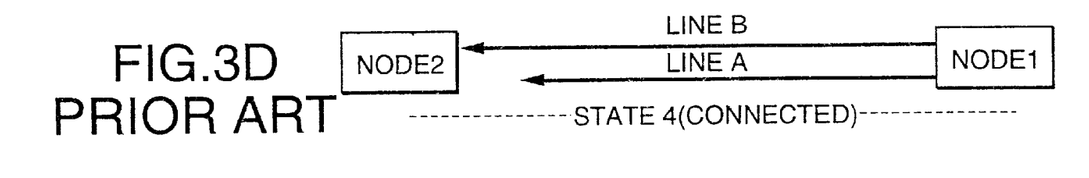
Figure 3E:
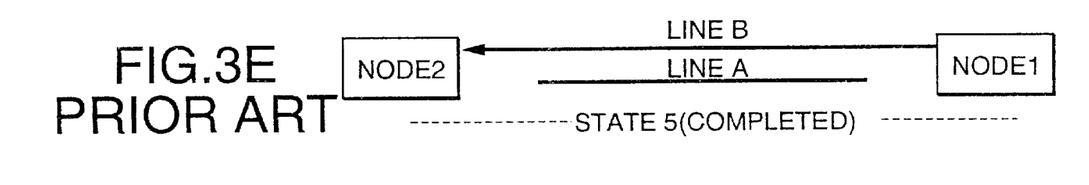

The operation of the prior art method of modifying the path is described now by referring to FIGS. 3A through 3E. FIG. 3A, shows a state in which a signal sent from the first node 1 to the first line A is being received by the second node 2 (hereinafter referred to as state 1). To modify the path, the first node 1 transmits the same signal as sent to the first line A to the second line B (FIG. 3B). This state shown in FIG. 3B, is referred to as state 2. The second node 2 disconnects the line used to receive from the first line A (FIG. 3C). The second node 2 connects a line to receive from the second line B (FIG. 3D). Subsequently, the first node 1 stops entry of signals into the first line A. In this way, the modification of the path is completed. States shown in FIGS. 3C and 3D, are referred to as states 3 and 4, respectively.

It is not assured that the line set up to make a transition from state 1 to state 2 is delivering the signal sent to the first line A, unlike the BRDG registration setting shown in FIGS. 4A through 4E. That is, the line set up to make a transition from state 1 to state 2 is merely a novel line added. Since the second node 2 is unable to receive two different signals simultaneously, it is necessary to disconnect the first line A from the second node 2 to make a transition from state 2 to state 4 (FIG. 3C). The second node 2 connects the second line B (FIG. 3D). Because the second node 2 does not have a function of checking the quality of the signals received from the first line A and the second line B and their identity, the second node 2 receives the signal from the second line B on the assumptions that the novel second line B added to the first node 1 is transmitting the same signal as sent through the first line A and that the quality of the second line B is good.

Figure 4A:
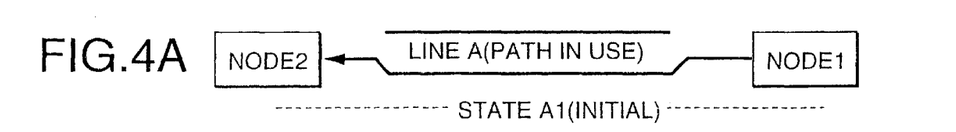
FIGS. 4A through 4E are diagrams illustrating the procedure for modifying the used path by a path modification system in accordance with the invention.
Figure 4B:
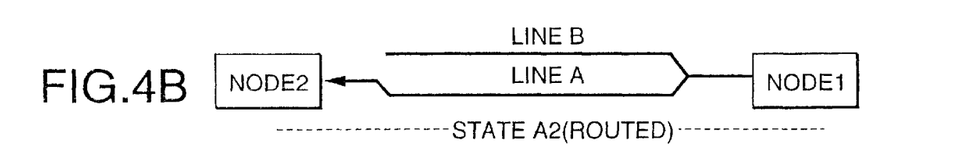
Figure 4C:
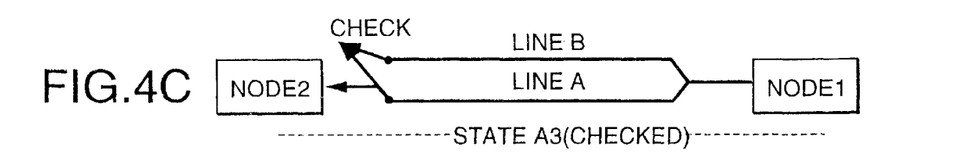
Figure 4D:
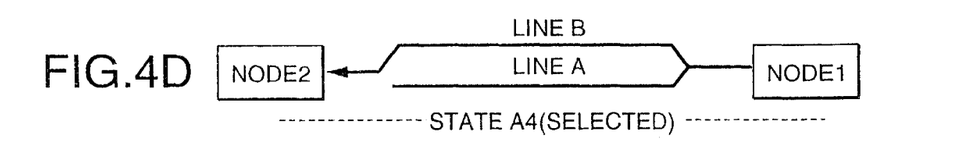
Figure 4E:
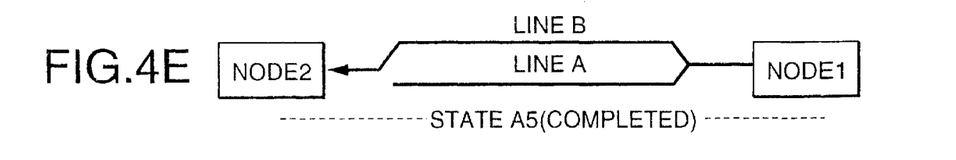

A path modification system in accordance with the present invention is hereinafter described by referring to FIGS. 4A through 4E, where a node 1 is transmitting an SDH signal to a node 2. In FIG. 4A, a signal sent to a line A from the node 1 is being received by the node 2. This state is referred to as state A1. To modify the path, the node 1 routes the signal, delivered to the line A, to a line B (FIG. 4B). This routing is referred to as signal divergence for making a transition from state A1 to another state. This state is referred to as state A2. The node 2 checks the quality of the lines A and B (FIG. 4C). This state is referred to as state A3. After checking that the quality of the line B is good, the node 2 selects the line B (FIG. 4D). This state is referred to as state A4. The node 1 stops entry of the signal into the line A, thus completing the modification of the path (state A5).

The signal divergence for making a transition from state A1 to state A2 is referred to as BRDG registration setting.

The setting for selecting a line to make a transition from state A3 to state A4 is referred to as ROLL setting. The line A used prior to the path modification to make a transition from state A4 to state A5 is disabled. This is referred to as BRDG-deleting setting.

In the state A3, J1 bytes within the path overhead (POH) bits of signals passed through both lines are compared to judge the quality of both lines A and B. After checking that the same signal is being passed through the lines A and B, the path overheads are monitored for bit errors, thus checking the quality of the line B. The path is changed from line A to line B only if the result of the check is that there exist no errors.

In this way, in the present invention, the main signal is prevented from being interrupted on modification of the path, by checking the quality of the line used after the modification by the node.

Figure 5:
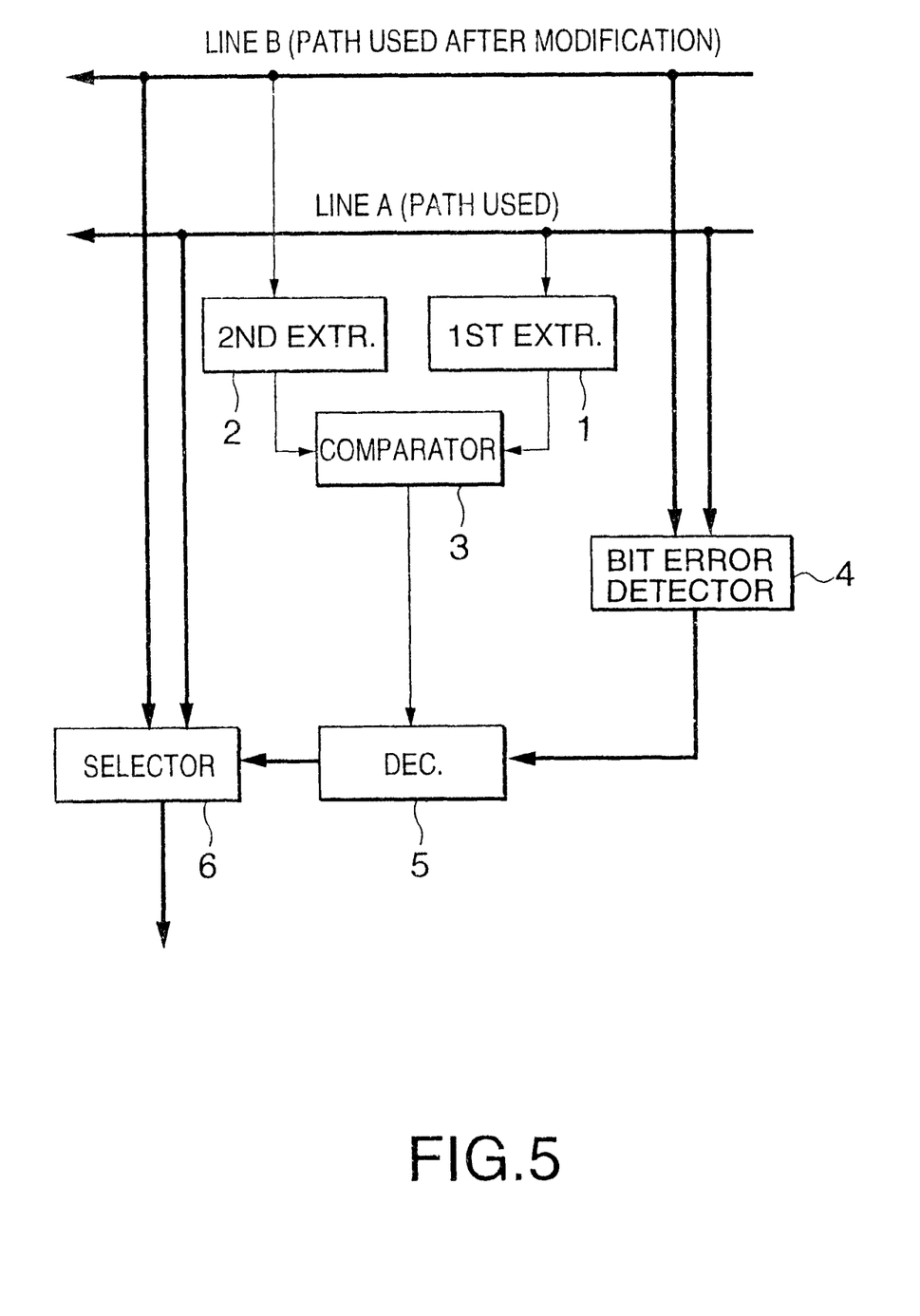
FIG. 5 is a diagram illustrating the functions of the path modification system in accordance with the invention.

The path modification system in accordance with the present invention is hereinafter described in further detail by referring to FIGS. 5, 6, 7A through 7D and 8A through 8C. FIG. 5 is a block diagram of a system for realizing the function of the path modification in accordance with the invention. This function is to select one of two higher-speed transmission lines A and B.

Referring to FIG. 5, a first extraction portion 1 extracts J1 byte from POH bits of the main signal transmitted through the line A and transmits the extracted byte to a comparator portion 3. A second extraction portion 2 extracts J1 byte from POH bits of the main signal transmitted through the line B and transmits the byte to the comparator portion 3. The comparator portion 3 compares the J1 byte transmitted from the first extraction portion 1 and the J1 byte transmitted from the second extraction portion 2. The result is passed to a decision portion 5. An error detection portion 4 monitors the lines A and B for bit errors and transmits the results to the decision portion 5. The decision portion 5 makes a decision from the result of the comparison made by the comparator 3 and from the detection made by the bit error detection portion 4 as to whether the line can be switched. The results are transmitted to a selector portion 6. This selector portion 6 selects either the line A or B, depending on the results of the decision made by the decision portion 5.

Figure 6:
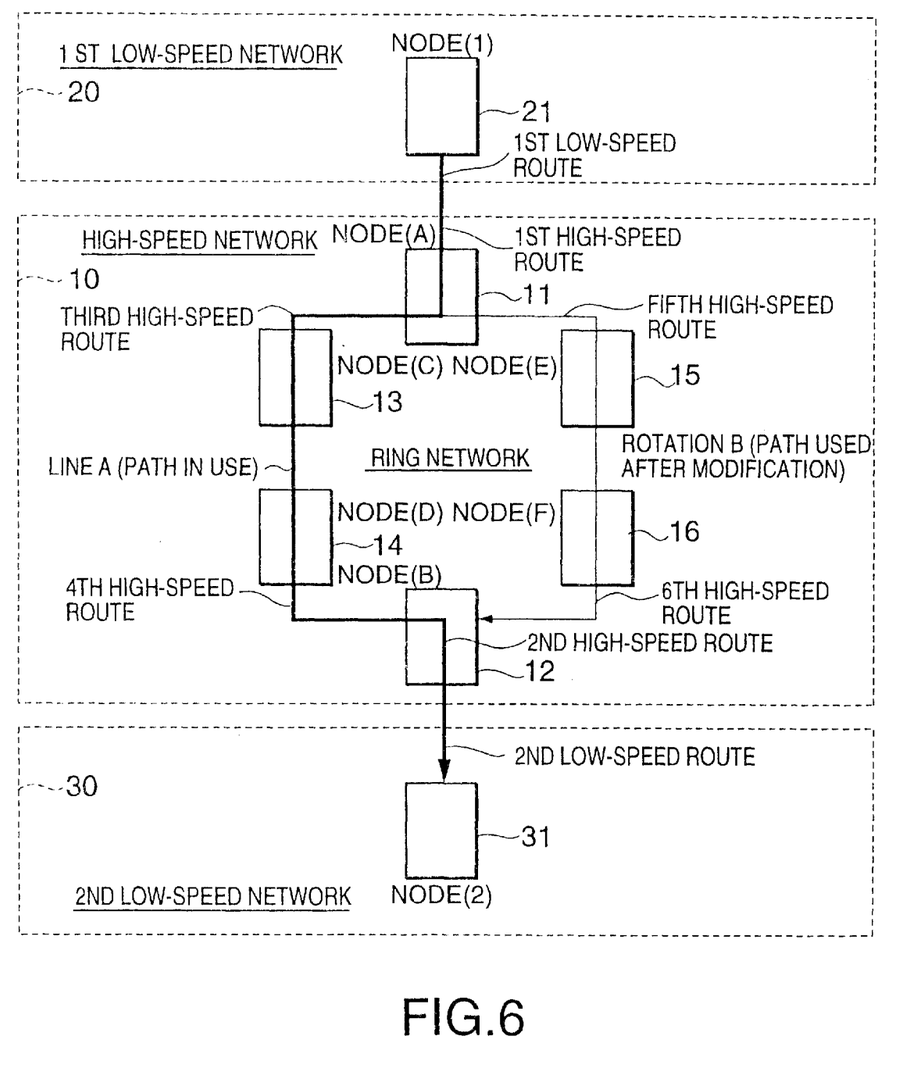
FIG. 6 is a circuit diagram of a ring network system in accordance with the invention.

FIG. 6 shows a ring network using nodes in accordance with the present invention. This ring network comprises a high-speed transmission network 10, a first low-speed transmission network 20 connected with the high-speed transmission network 10, and a second low-speed transmission network 30 connected with the high-speed transmission network 10. A first high-speed node 11 multiplexes an SDH signal delivered from the first low-speed node 21 forming the first low-speed transmission network 20 and transmits the multiplexed signal as a high-speed signal to the high-speed transmission network 10. A second high-speed node 12 converts the SDH signal passed through the high-speed transmission network 10 into a low-speed signal and transmits the converted signal to a second low-speed node 31.

The high-speed transmission network 10 contains lines A and B for connecting the first high-speed node 11 and the second high-speed node 12. The line A is a transmission path currently used by the second high-speed node 12, and is transmitting a high-speed signal from the first high-speed node 11 to the second high-speed node 12 via the third high-speed node 13 and via the fourth high-speed node 14. The line B is not presently used by the second high-speed node 12. The line B is a backup transmission line. A high-speed signal is transmitted from the first high-speed node 11 to the second high-speed node 12 via a fifth high-speed node 15 and via a sixth high-speed node 16.

A node for receiving an input signal from other than the high-speed transmission network 10 forming the ring network is herein referred to as a head & bridge node. A node for transmitting the output signal to the outside of the high-speed network 10 is herein referred to as a tail & switch node.

The operation of the system in accordance with the present embodiment is described. Signal transmissions include one-way transmission and two-way transmission. Where the path modification method in accordance with the present invention is used for one-way transmission, the path is modified as illustrated in FIGS. 7A through 7D.

Figure 7A:
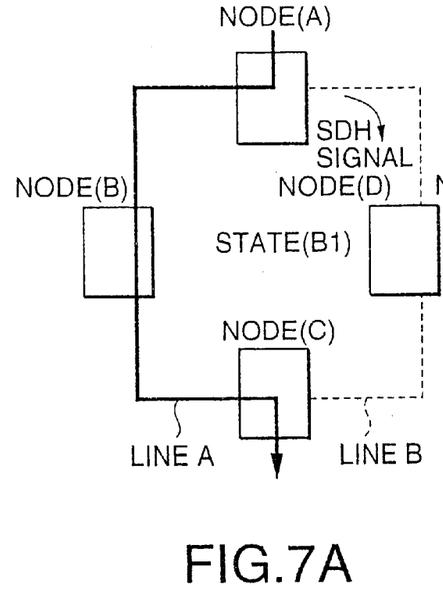
FIGS. 7A through 7D are circuit diagrams of the ring network system shown in FIG. 6, illustrating its operation.
Figure 7B:
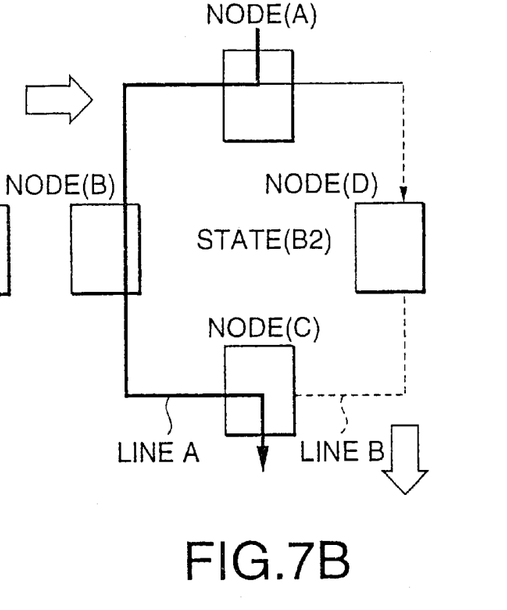
Figure 7C:
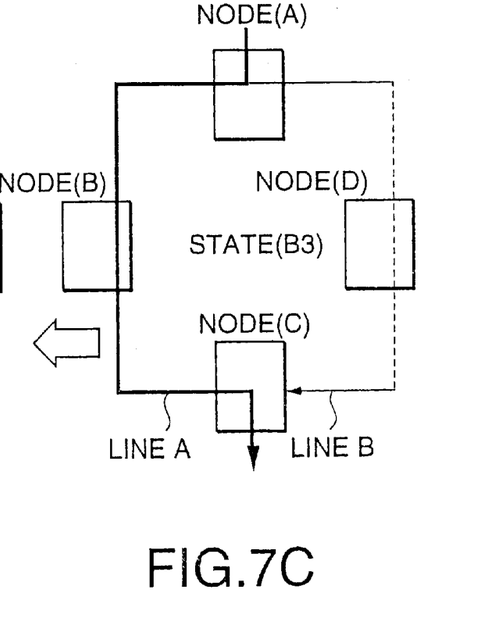

In FIGS. 7A through 7D, it is assumed that a node A is a head & bridge node and that a node C is a tail & switch node. The node A is so set up that signals are transmitted from outside the ring to a node D. BRDG registration setting is effected to transmit the same SDH signal as transmitted to the line A (FIG. 7A). This state is referred to as state A circuit is set up at the node D to route the SDH signal received from the node A toward the node C as shown in FIG. 7B. This state is referred to as state B2. In FIG. 7C, the node C is receiving the SDH signals from the lines A and B at the nodes B and D, respectively. This state is referred to as state B3. If both received signals agree in J1 byte of POH, it is judged that the contents of both received signals are coincident.

Figure 7D:
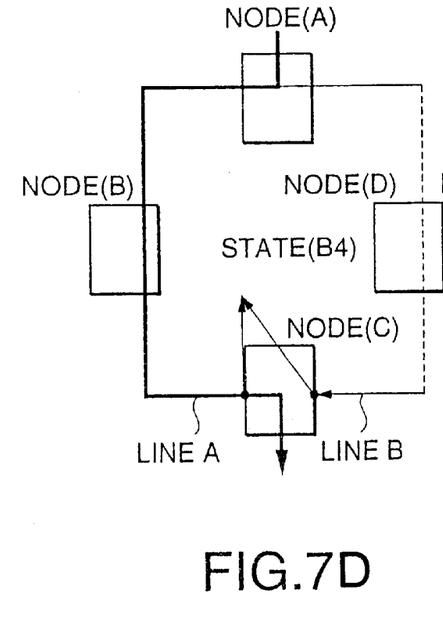
Figure 8A:
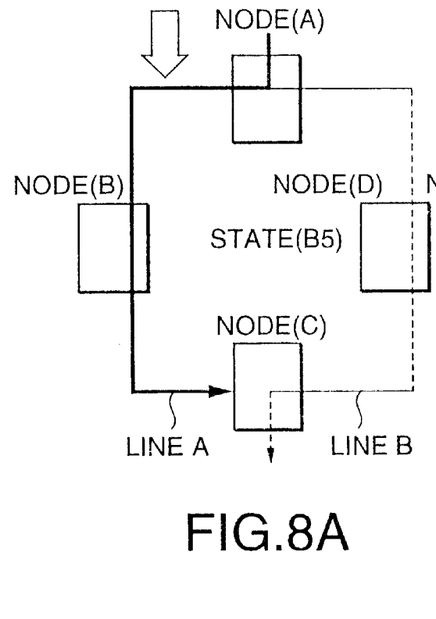
FIGS. 8A through 8C are circuit diagrams illustrating the operation of the ring network system shown in FIGS. 7A through 7D after state B4.

Simultaneously with the comparison described above, errors in the POH of the signal received from the line B are detected to judge whether the line B has errors. If the result of the decision is that no errors exist in the line B, a check is made to see that the quality of the line B is good. Then, the following setting is effected to switch the direction of reception of the signal that is to be routed to the outside of the ring, as shown in FIG. 7D. This state is referred to as state B4. Line setting is effected at the node C to transmit the signal received from the node D to the outside of the ring. At the same time, ROLL setting is effected to disconnect the line going from the node B to the outside of the ring, as shown in FIG. 8A. This is referred to as state B5.

Figure 8B:
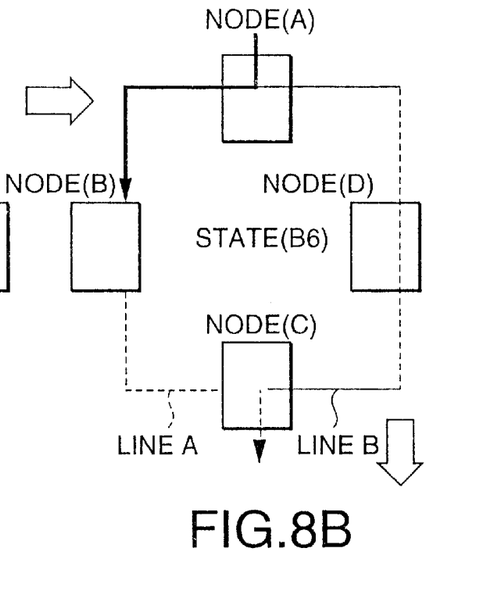
Figure 8C:
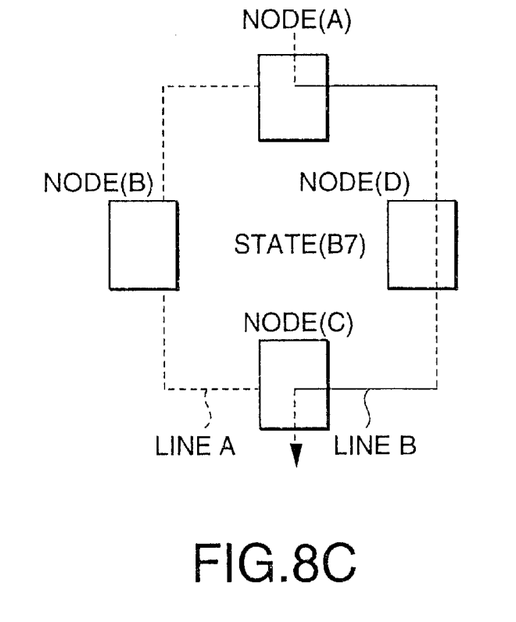

The modification of the path is completed by the procedure described thus far. Since the setting on the side of the line A used prior to the modification remains, the following processing is carried out to delete the setting. The setting for the line going from the node A to the node C is deleted from the node B, as shown in FIG. 8B. This is referred to as state B6. BRDG-deleting setting is effected at the node A. The setting for routing from outside the ring to the node B is deleted by BRDG-deleting setting, as shown in FIG. 8C. This is referred to as state B7. The modification of the path from the line A to the line B is completed by the procedure described above. The modification of the path, using the BRDG (bridge) registration setting, ROLL setting, and BRDG-deleting setting as described above is referred to as bridge & roll procedure.

The operation of another embodiment of the present invention, i.e., a system for modifying the path in two-way transmission, is next described by referring to FIGS. 9A through 9D. In the case of two-way transmission, each of nodes A and C acts as a head & bridge and also as a tail & switch node. Therefore, no nomenclature is given. Either name is used according to the direction of travel of signal. The bridge & roll procedure in one-way transmission is carried out in the direction from the node A to the node C via the node B and also in the direction from the node C to the node A via the node B. Thus, the path can be changed in two-way transmission.

Figure 9A:
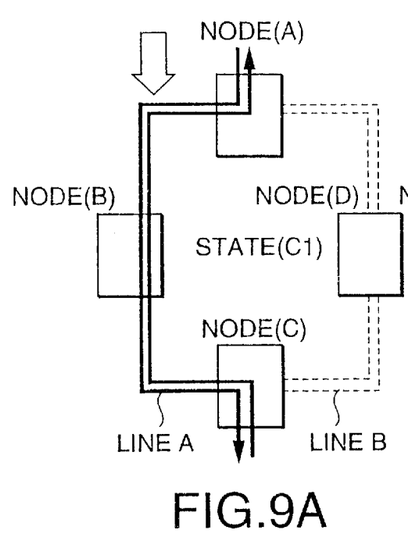
FIGS. 9A through 9D are circuit diagrams of another ring network system in accordance with the invention.
Figure 9B:
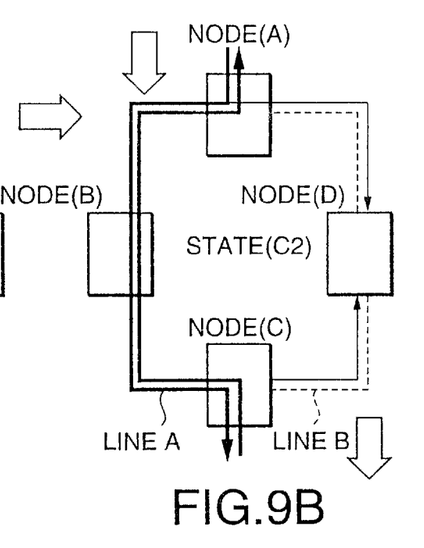
Figure 9C:
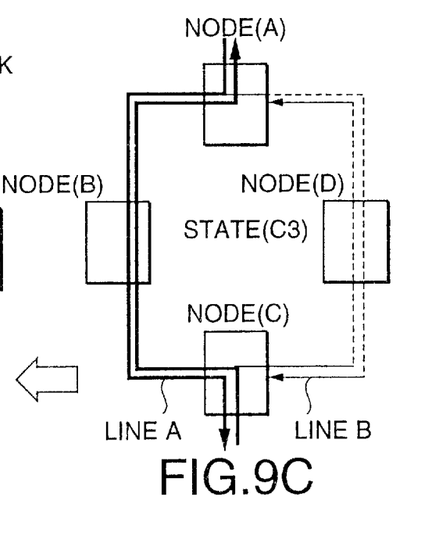

In the state C1 shown in FIG. 9A, BRDG registration setting is effected at the node A to pass signals from outside the ring toward the node D. The same SDH signal is transmit as transmit to the line A. Line setting is effected at the node C to pass signals from outside the ring toward the node D. The same SDH signal is transmitted to the node D as transmit to the line A, as shown in FIG. 9B. This state is referred to as state C2. Line setting is effected at the node D to transmit the SDH signal received from the node A to the node C and to transmit the SDH signal received from the node C to the node A. That is, two-way transmission setting is effected between the nodes A and C, as shown in FIG. 9C. This state is referred to as state C3.

Figure 9D:
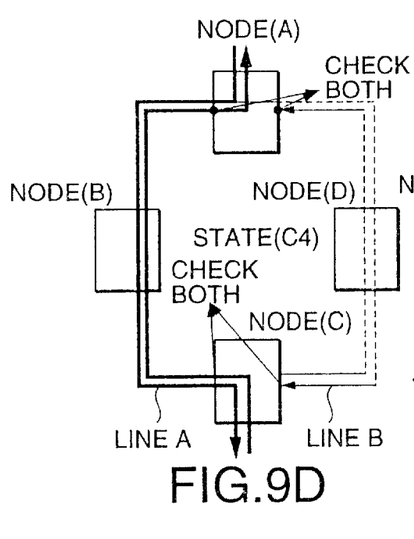
Figure 10A:
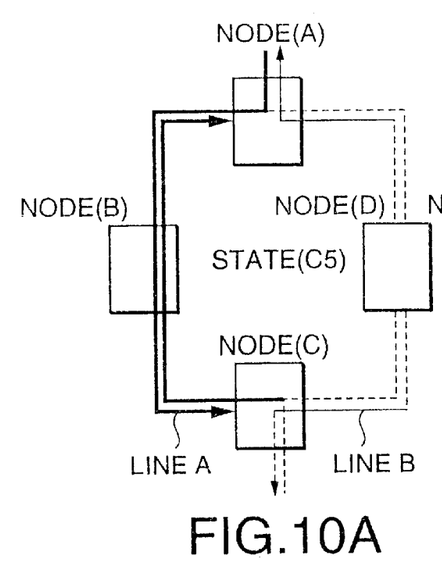
FIGS. 10A through 10c are circuit diagrams illustrating the operation of the ring network system shown in FIGS. 9A through 9D after state C4.

In FIG. 9C, the SDH signals from the lines A and B are received at the nodes C and A. At these nodes A and C, if J1 bytes in POH of the received signals agree, it is judged that both signals are coincident in contents. At the same time, errors in the POH received from the line B are read, and a decision is made as to whether the line B involves errors, as shown in FIG. 9D. This state is referred to as state C4. If the line B contains no errors, and if it is confirmed that the line B is of good quality, the following line setting is effected to switch the direction of reception of the signal to be transmitted to the outside of the ring. Roll setting is effected at the node C to route the signal received from the node D to the outside of the ring and to disconnect the line passing from the node B to the outside of the ring. Concurrently, roll setting is effected at the node A to route the signal received from the node D to the outside of the ring and to disconnect the line passing from the node B to the outside of the ring, as shown in FIG. 10A. This state is referred to as state C5.

Figure 10B:
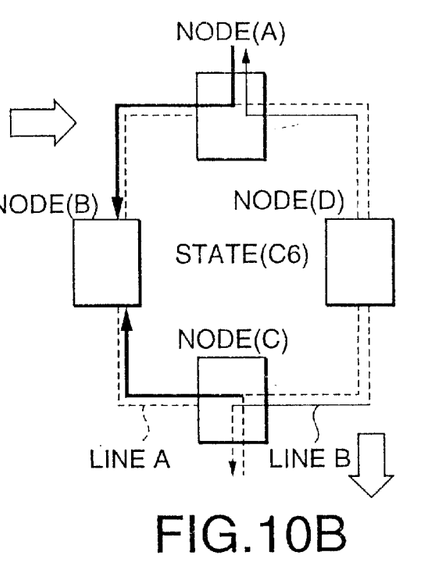
Figure 10C:
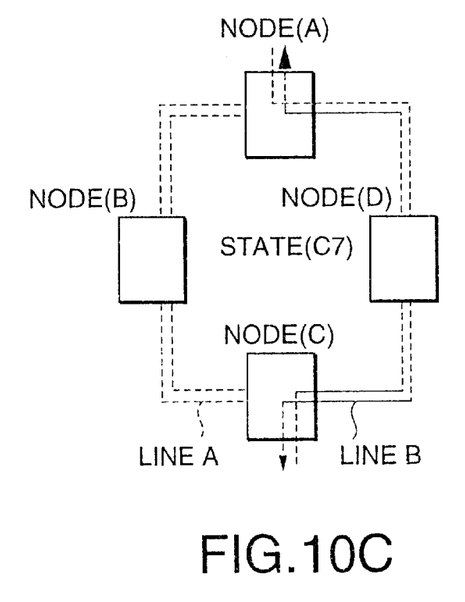

Then, the setting at the node B to pass signals from the node A to the node C is deleted. Also, the setting to pass signals from the node C to the node A is deleted, as shown in FIG. 10B. This state is referred to state C6. BRDG-deleting setting is effected at the nodes A and C to delete the setting of the line going from the node B to the outside of the ring network, as shown in FIG. 10C. This state is referred to as state C7. The modification of the path going from the line A to the line B is completed by the procedure described above. This state is referred to as state C7.

A further embodiment of the present invention is described. This embodiment is similar to the embodiments described above except for the following. After performing the procedure described already in connection with FIGS. 7A through 7D and 8A through 8C, the line on the side of the line A is exchanged under state B7 shown in FIGS. 8A through 8C, or a new node is added among nodes A, B, and C. Then, a procedure that is exactly opposite to the bridge & roll procedure described above is carried out, thus returning to state B1. The procedure described above permits use of the present system on exchange of a line or for an addition of a node.

It is to be understood that the invention can be applied to a linear system (a bus network system) as well as to a ring network system. As an example of application, this linear system is described below.

A method of modifying the path in a linear system is described by referring to FIGS. 11A through 11G. As shown in FIG. 1A, an SDH signal is transmitted, using a line A going to a node C from a node A via a node B. This state is referred to as state D1. It is assumed that the node A is a head & bridge node and that the node C is a tail & switch node.

Figure 11A:
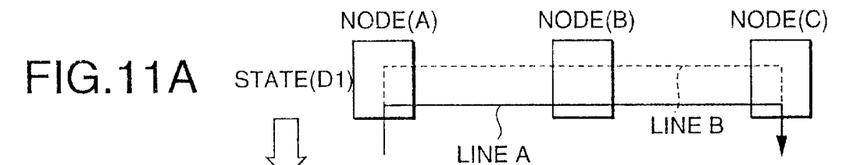
FIGS. 11A through 11G are diagrams illustrating the operation of a further ring network system in accordance with the invention.
Figure 11B:
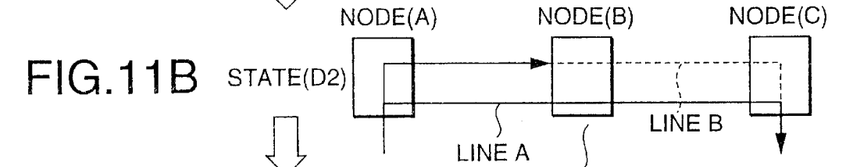
Figure 11C:
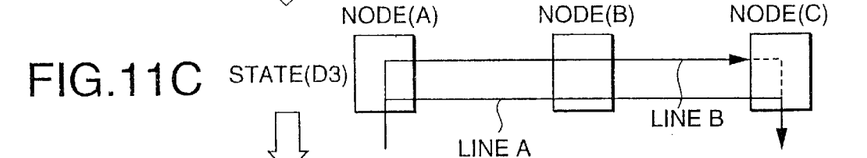

Line setting is effected at the node A, using the line B, to pass signals from outside the network toward the node B. The same SDH signal is transmitted to the line B as transmit to the line A, as shown in FIG. 11B. This state is referred to as state D2. Line setting is effected at the node B to transmit the SDH signal to the node C, the SDH signal being received at the node A using the line B, as shown in FIG. 11C. This state is referred to as state D3. In FIG. 1C, the node C is receiving the SDH signals originating from the lines A and B from the node B.

Figure 11D:
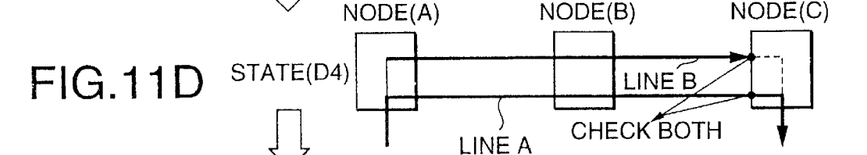
Figure 11E:
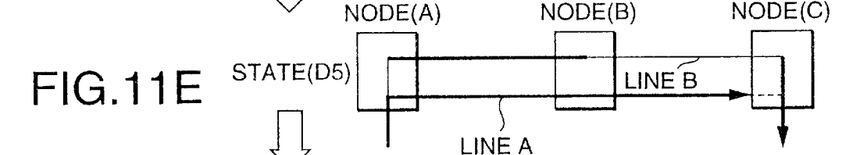

If J1 bytes of the POH included in both received signals agree, both received signals are judged to have the same contents. Simultaneously with the comparison described above, errors in the POH received from the line B are detected. A decision is made as to whether the line B contains errors, as shown in FIG. 1D. This state is referred to as state D4. If there are no errors, it is confirmed that the line B is of good quality. The following line setting is effected to switch the direction of reception of signals to be transmitted to the outside of the network. Line setting is effected at the node C to transmit the signal to the outside of the network, the signal being received from the line B in the direction of the node B. At the same time, line setting is effected at the node B to disconnect the line going from the line A to the outside of the network, as shown in FIG. 1E. This state is referred to as state D5.

Figure 11F:
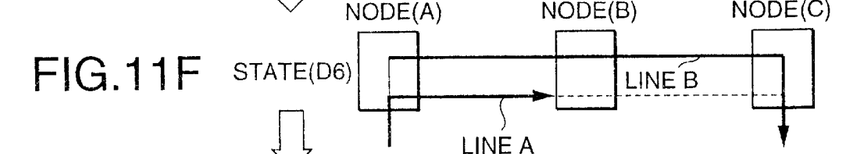
Figure 11G:
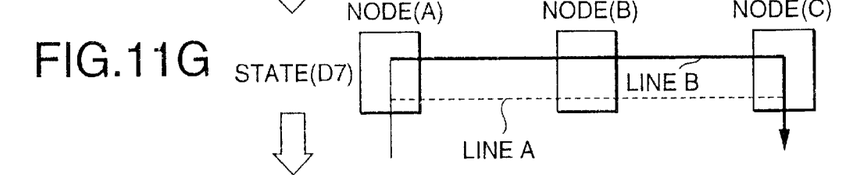

The modification of the path itself ends with the processing described above. However, the setting on the side of the line A used prior to the modification remains and so it is necessary to eliminate this setting. The line setting at the node B to go from the node A to the node C, using the line A, is deleted, as shown in FIG. 11F. This state is referred to as state D6. The setting at the node A to go from outside the network to the node B, using the line A, is deleted, as shown in FIG. 11G. This state is referred to as state D7. The modification of the path from the line A to the line B is completed by the procedure described thus far.

As described thus far, the present invention yields the following advantages. First, when a signal is split, bridge registration setting assures that the same input signal is transmitted by two lines.

Secondly, selection of a path of poor quality can be prevented by checking deterioration of the quality of a signal received from a destination path before the direction of reception of a signal to be transmitted to the outside of the ring network is switched by roll setting. The check is made by transmitting a signal used during operation.

Thirdly, before switching the direction of reception of a signal to be transmitted to the outside of the ring network by roll setting, it is confirmed that signals received from both paths are the same. Therefore, a path through which a different signal is being transmitted is prevented from being selected.

Fourthly, no limitations are imposed on the combinations of paths modified by bridge & roll procedure except for limitations on the line. Consequently, every line direction and every line bandwidth can be effectively utilized.

What is claimed is:

1. A system for modifying a path in a one-way transmission network system formed by nodes, said nodes comprising at least a first node and a second node between which a first transmission line and a second transmission line exist, said second node receiving a signal over said first transmission line outputted from said first node thus forming said path for said signal, said system comprising:

said first node including a routing means for routing the signal outputted to said first transmission line to said second transmission line to modify said path for said signal, and a disconnecting means for disconnecting said first transmission line to stop input of signals to said first transmission line on modification of said path; and said second node including a quality-checking means for checking quality of said first and second lines utilizing said signal and a selecting means for selecting said second transmission line as said path after checking that said second transmission line is of good quality.

2. A system for modifying a path in a transmission network system as claimed in claim 1, wherein each of said first and second lines comprises:

first and second extraction units for extracting received signals transmitted by said first and second lines, respectively, after the signals are routed to said second line;

a comparator for comparing received signals extracted by said first and second extraction units, respectively;

a bit error detector for extracting bit errors from received signals transmitted by said first and second lines, respectively;

a discrimination unit for discriminating based on results of the comparison as to whether the received signals on both lines are the same or not and discriminating based on an output signal from said bit error detection portion as to whether there are errors; and a selection unit for selecting said first line or said second line according to discrimination results by said discrimination unit.

3. A system for modifying a path in a transmission network system as claimed in claim 2, wherein said first and second extraction units extract J1 bytes from path overhead bits of a main signal transmitted through said first and second lines, respectively.

4. A system for modifying a path in a transmission network system as claimed in claim 2, wherein routing registration setting is effected to route the signal to said second line, then circuit selection setting is effected for said circuit selection, and then circuit-deleting setting is effected to disable the line used before the modifications of the path.

5. A system for modifying a path in a transmission network system as claimed in claim 1, wherein there are plural nodes between said first and second nodes forming said transmission network.

6. A system for modifying a path in a transmission network system as claimed in claim 1, wherein said transmission network is a ring network.

7. A system for modifying a path in a transmission network system as claimed in claim 1, wherein said transmission network is a bus network.

8. A system for modifying a path in a two-way transmission network system formed by nodes, said nodes comprising at least a first node and a second node between which a first transmission line and a second transmission line exist, said second node receiving a signal over said first transmission line outputted from said first node and said first node receiving a signal over said first transmission line outputted from said second node thus forming said path for said signals, said system comprising:

said first node including: i) a routing means for routing the signal outputted to said first transmission line to said second transmission line to modify said path for said signal; ii) a quality-checking means for checking quality of said first transmission line and said second transmission line utilizing said signal; iii) a selecting means for selecting said second transmission line as said path after checking that said second transmission line is of good quality and iv) a disconnecting means for disconnecting said first transmission line to stop input of signals to said first transmission line on modification of said path; and said second node including: i) a routing means for routing the signal outputted to said first transmission line to said second transmission line to modify said path for said signal; ii) a quality-checking means for checking quality of said first transmission line and said second transmission line utilizing said signal; iii) a selecting means for selecting said second transmission line as said path after checking that said second transmission line is of good quality; and iv) a disconnecting means for disconnecting said first transmission line to stop input of signals to said first transmission line on modification of said path.

9. A system for modifying a path in a transmission network system as claimed in claim 8, wherein each of said first and second lines comprises:

first and second extraction units for extracting received signals transmitted by said first and second lines, respectively, after the signals are routed to said second line;

a comparator for comparing received signals extracted by said first and second extraction units, respectively;

a bit error detector for extracting bit errors from received signals transmitted by said first and second lines, respectively;

a discrimination unit for discriminating based on results of the comparison as to whether the received signals on both lines are the same or not and discriminating based on an output signal from said bit error detection portion as to whether there are errors; and a selection unit for selecting said first line or said second line according to discrimination results by said discrimination unit.

10. A system for modifying a path in a transmission network system as claimed in claim 9, wherein said first and second extraction units extract J1 bytes from path overhead bits of a main signal transmitted through said first and second lines, respectively.

11. A system for modifying a path in a transmission network system as claimed in claim 8, wherein there are plural nodes between said first and second nodes forming said transmission network.

12. A system for modifying a path in a transmission network system as claimed in claim 8, wherein said transmission network is a ring network.

13. A system for modifying a path in a transmission network system as claimed in claim 8, wherein said transmission network is a bus network.

* * * * *